United States Patent [19]

Dame et al.

[11] 3,766,415

[45] Oct. 16, 1973

[54] PIEZOLECTRIC ACTUATOR

[76] Inventors: Richard E. Dame, 224 Northwest Ter., Silver Spring, Md. 20901; Ewald E. Schmidt, 9010 First St., Lanham, Md. 20801

[22] Filed: Apr. 18, 1972

[21] Appl. No.: 245,234

[52] U.S. Cl. .................... 310/8.3, 310/8.1, 310/8.7

[51] Int. Cl. .................... H04r 17/00

[58] Field of Search .................... 310/8, 8.2, 8.3, 310/8.5, 8.6, 8.7, 8.8, 9.1, 9.4; 417/322

[56] References Cited

UNITED STATES PATENTS

| | | | |
|---|---|---|---|
| 3,598,506 | 8/1971 | Garrett | 310/8 X |
| 2,587,482 | 2/1952 | Keller | 310/8.7 X |
| 3,478,246 | 11/1969 | Perkins | 310/8 X |
| 3,614,486 | 10/1971 | Smiley | 310/8.3 X |
| 3,033,027 | 5/1962 | Perls et al. | 310/8.7 X |
| 3,501,099 | 3/1970 | Benson | 310/8.7 X |

*Primary Examiner*—J. D. Miller
*Assistant Examiner*—Mark O. Budd
*Attorney*—John N. Randolph

[57] ABSTRACT

An ultra-sensitive actuator possessing substantial load carrying capacity and positioning range and which is capable of producing motions of 1 micro-inch or less with accuracy, which is thus especially adapted for supplying forces and displacements required to change the figures of mirrors and structural elements of optical equipment, such as, telescopes, including large space telescopes, optical polishing beds, mirrors for positioning devices, mirror deflection devices, mirror aspheric generators and electronic and optional tracking and positioning devices. The actuator includes a housing containing a piezoelectric stack consisting of oppositely oriented piezoelectric crystal discs arranged alternately in series to provide maximum expansion; a normally sealed chamber containing a liquid; a diaphragm dividing a portion of the housing containing the stack from the chamber, and an extensible housing end portion located at the end of the chamber disposed remote from the diaphragm. When a proper voltage is applied to the stack, it is extended to force the diaphragm into the sealed chamber for causing the liquid to exert a driving force against the extensible housing end portion for moving said end portion outwardly of the housing. An expansible bellows defines a part of the chamber and bears against the extensible end portion of the housing and together with the diaphragm amplifies the stack movement. Valves are provided for selectively trapping the displaced liquid for replenishing the liquid and for bleeding the chamber.

9 Claims, 5 Drawing Figures

PIEZOLECTRIC ACTUATOR

SUMMARY

A primary object of the invention is to provide an actuator capable of producing motion within 1 microinch of accuracy yet possessing large load capacity and positioning range for deforming and positioning optical apparatus.

Other objects of the invention are to provide an actuator which is compact and self contained with regard to the output forces produced; which has no backlash due to elastic energy or slack in its components; which is capable of simultaneously positioning several elements; and which is substantially unaffected by changes in ambient temperatures.

Various other objects and advantages of the invention will hereinafter become more fully apparent from the following description of the drawings, illustrating presently preferred embodiments thereof, and wherein:

DESCRIPTION OF THE PREFERRED EMBODIMENTS

Figure 1:
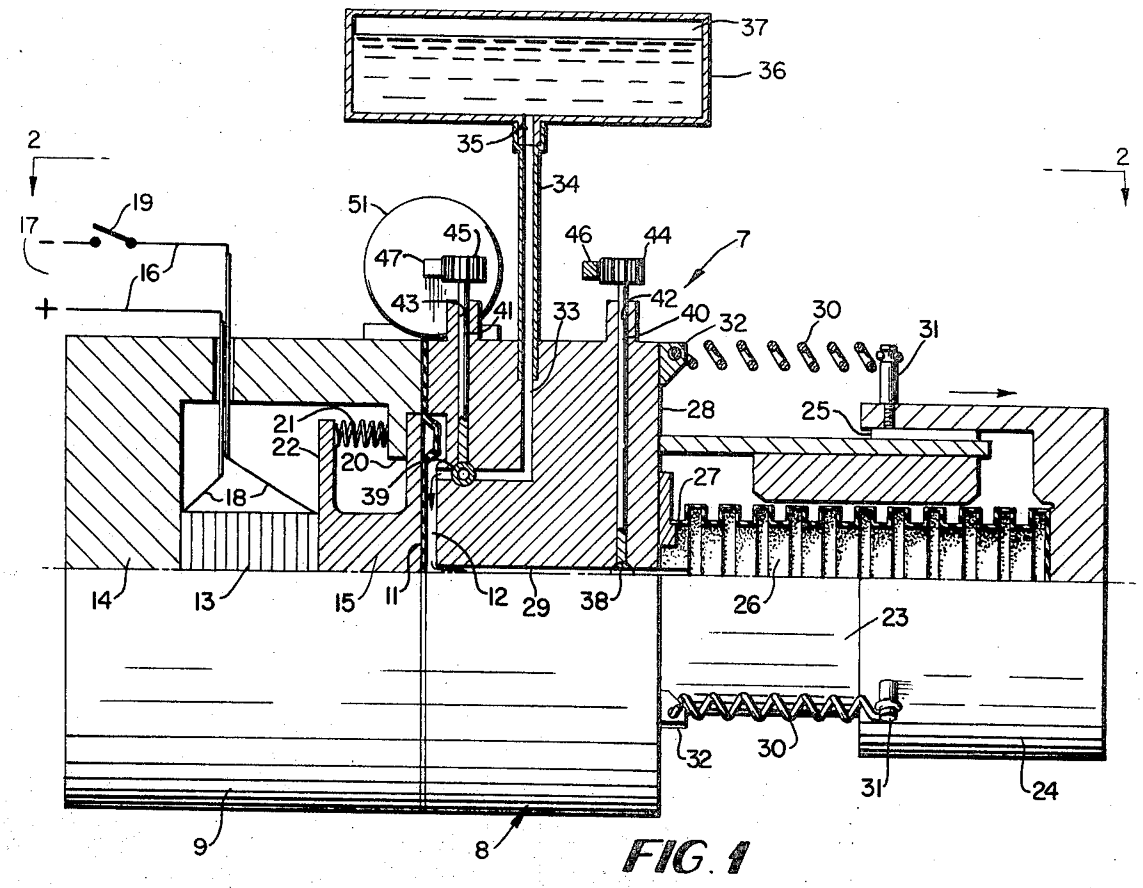
FIG. 1 is a view partly in longitudinal section and partly in side elevation of a preferred embodiment of the actuator.
Figure 2:
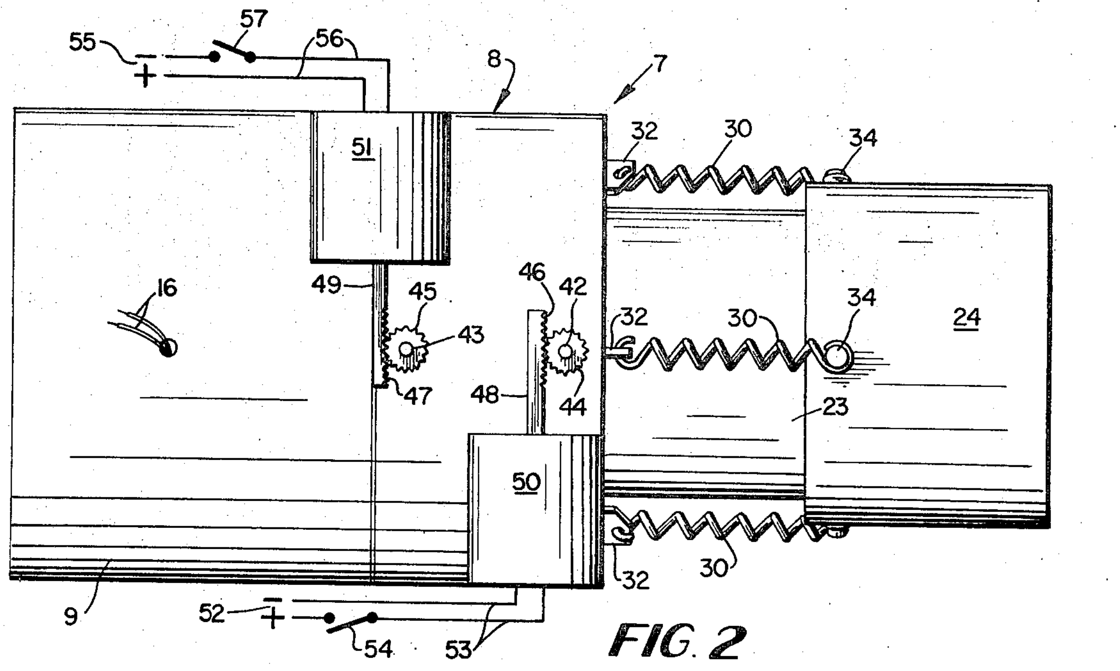
FIG. 2 is a horizontal sectional view, taken substantially along a plane as indicated by the line 2—2 of FIG. 1.

Referring more specifically to the drawings and first with reference to FIGS. 1 and 2, a piezoelectric actuator in its entirety is designated generally 7 and includes an elongated housing 8 composed of a material having a low coefficient of thermal expansion and thermal conductivity, which possesses substantial strength and a high modulus of elasticity, such as, a ceramic. The housing 8 includes an end portion 9 which is recessed to provide a cavity 10. A diaphragm 11 extends across the housing to define an inner end of the cavity 10 and separates said cavity from a chamber 12 of the housing.

A piezoelectric stack 13 is disposed in the cavity 10 between an end wall 14 of the housing end portion 9 and a push plate 15. The stack 13 comprises oppositely oriented piezoelectric crystal discs alternately stacked in series to provide maximum expansion. Electrical conductor wires 16, leading from an electric current source 17, connect with the two contacts 18 of the crystal stack 13. An electric switch 19 is interposed in one of the conductor wires 16.

One side of the push plate 15 abuts against the outer end of the stack 13 and the opposite side thereof abuts against and is secured to one side of the diaphragm 11. The housing end portion 9 has a plurality, preferably three, circumferentially spaced abutments 20, only one of which is shown, projecting into the cavity 10 against which portions of the plate 15 abut to limit movement of the plate toward the stack 13. The abutments 20 also provide stops for compression springs 21 having opposite ends abutting against lateral projections 22 of the plate 15, so that the springs 21 urge the plate 15 away from the diaphragm 11 and toward the stack 13.

The housing 8, adjacent its opposite end, is provided with a restricted tubular portion 23. Said housing has an opposite end portion 24 in the form of a cap which telescopically engages on the portion 23 and which is provided with internal guides 25 which engage the exterior of the housing part 23.

A bellows 26 is disposed in the housing portion 23 and has an open end 27 which is secured to the transverse wall 28 of the housing, from which the housing portion 23 projects. Said open end 27 of the bellows is disposed around a passage 29 forming a part of the chamber 12 and connecting the chamber portion located adjacent the diaphragm 11 to the hollow interior of the bellows 26 which forms a part of said chamber 12. A closed outer end of the bellows 26 abuts the outer end wall of the housing member 24.

A plurality, preferably three, contractile or pull springs 30 are anchored to and extend between posts 31 which radiate from the housing member 24 and apertured ears 32 which project from the wall 28 for urging the housing member 24 inwardly and toward a retracted position.

A passage 33 leads from a part of the chamber 12, located adjacent the diaphragm 11, and connects with the conduit 34 extending upwardly from the housing 8 and which in turn connects with a downwardly opening port 35 in the bottom of the reservoir or sump 36 containing a liquid 37, corresponding to the liquid which fills the chamber 12. The liquid 37 preferably has a low coefficient of thermal expansion and a relatively high bulk modulus to assure that the actuator is relatively unaffected by changes in ambient temperature and to minimize elastic cubical dilatation of the liquid under load.

The value 38 is mounted in the passage 29 and a valve 39 is mounted in the passage 33. The valves 38 and 39 have valve stems 40 and 41, respectively, fitting rotatively in bores 42 and 43, respectively, of the housing 8. Pinions 44 and 45 are secured to the ends of the valve stems 40 and 41, respectively, which are disposed externally of the housing 8.

The pinions 44 and 45 mesh with rack portions 46 and 47, respectively, of armatures 48 and 49, respectively, forming parts of solenoids 50 and 51, respectively, as best seen in FIG. 2. The solenoid 50 is connected to a current source 52 by electric wiring 53 including a switch 54; and the solenoid 51 is similarly connected to a current source 55 by electric wiring 56 including a switch 57.

Prior to operating, the system is filled with a fluid. With the valve 38 in an open position and the valve 39 in a closed position, as illustrated in FIG. 1, the switch 19 is closed to supply a prescribed voltage to the piezoelectric stack 13 to cause said stack to be distended lengthwise for exerting a thrust against the plate 15 and diaphragm 11 for moving said parts from left to right for forcing the drive liquid 37 from the end of the chamber located adjacent the diaphragm 11, through the passage 29, past the open valve 38 into the bellows 26 for distending said bellow lengthwise from left to right of FIG. 1 for advancing the drive head member 24 forward, or from left to right. Three or four circumferentially spaced guides 58 are provided between the housing portion 23 and the bellows 26 for stabilizing the bellows against the lateral bucking to assure a large load carrying capacity. The springs 30 are provided not only to return the drive head 24 but for preloading said head to prevent backlash. The valve 38 can be closed for maintaining pressure in the bellows when the stack 13 is deenergized. This is accomplished by closing the switch 54 to energize the solenoid 50 for exerting a thrust or pull on the armature 48. The armature 49 is similarly moved for turning the pinion 45 to open the valve 39.

With the valve 38 in a closed position, when the stack 13 is deenergized to allow the springs 21 to displace the plate 15 and diaphragm from right to left, back to their positions of FIG. 1, a partial vacuum will be created in the portion of the chamber 12 located adjacent the diaphragm 11 so that liquid 37 will be drawn into said chamber portion from the sump 36 when the valve 39 is open. Thereafter, with the valve 39 closed and the valve 38 open, the operation previously described will be repeated for further extending the bellows 26 and drive head 24.

The bellows may be retracted in a step by step manner by closing the valve 38 and opening the valve 39 and thereafter energizing the stack 13 to force liquid 37, trapped between the diaphragm 11 and valve 38 back into the sump 36. The valve 39 is then closed and the valve 38 opened after which the stack 13 is deenergized to allow the springs 21 to return the plate 15 and diaphragm 11 back to their positions of FIG. 1 to draw the liquid from the bellows 26 through the passage 29 toward the diaphragm 11. The valve 38 is then closed and the valve 39 is opened and the operation is repeated as many times as is required.

The bellows 26 may also be retracted in a single operation by opening both valves 38 and 39 with the stack 13 deenergized. The difference in pressure between the chamber 12 and sump 36 will cause the liquid 37 to flow back to the sump past the open valve 39.

Figure 3:
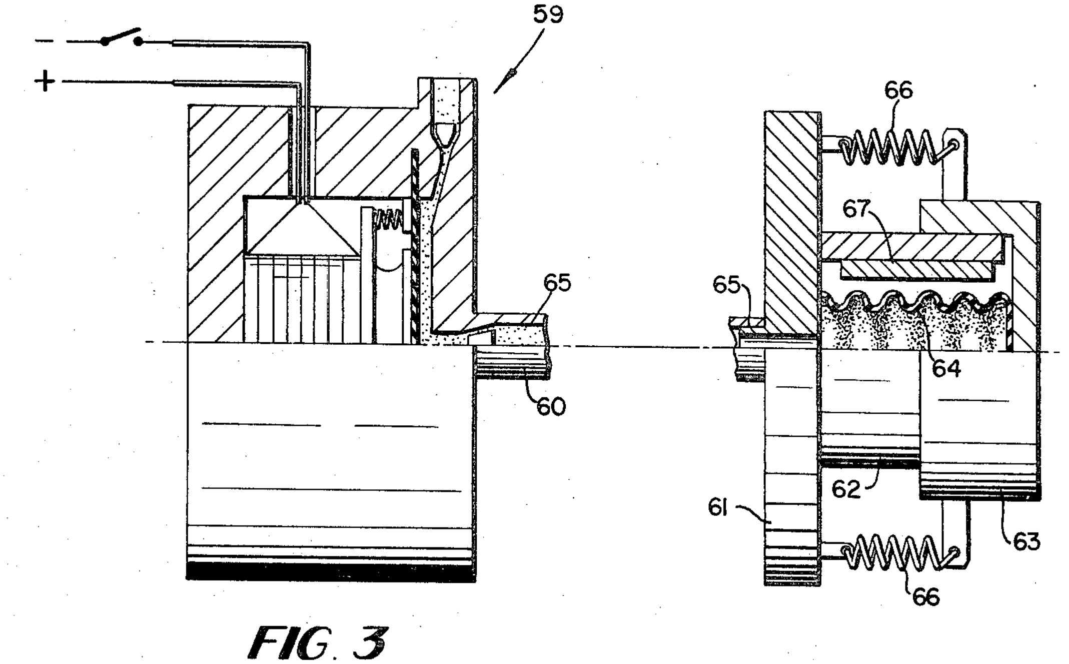
FIG. 3 is a fragmentary side elevational view partly in longitudinal section, with certain of the parts omitted, illustrating a modification of the actuator.

FIG. 3 illustrates a modification of the piezoelectric actuator, designated generally 59, and which differs from the actuator 7 in that the passage 29 is replaced by a tubular housing portion 60 leading from the housing portion containing the piezoelectric stack and the diaphragm to a disc-shaped housing portion 61 which may be spaced any distance from the diaphragm. A cylindrical housing portion 62 projects from the outer side of the disc 61 to replace the housing portion 23 of the actuator 7 and to provide a support for the drive head 63 which is cup-shaped and which fits telescopically thereon. A bellows 64 is secured to the disc 61, within the cylindrical housing member 62, and has a closed end abutting the outer end of the drive head 63. The passage 65 of the tubular portion 60 extends through the disc 61 into the bellows 64. Springs 66 are provided for the same purpose as the springs 30 and guides 67 function for the same purpose as the guides 58. The operation of the actuator 59 corresponds to the operation of the actuator 7, as previously described, except that the drive head 63 may be disposed at any point remote from the housing portion containing the stack and the diaphragm. The valves of the actuator 59 correspond to the valves of the actuator 7 and the actuator 59 may be provided with valve actuators and a sump, not shown, as illustrated in connection with the actuator 7.

Figures 4, 5:
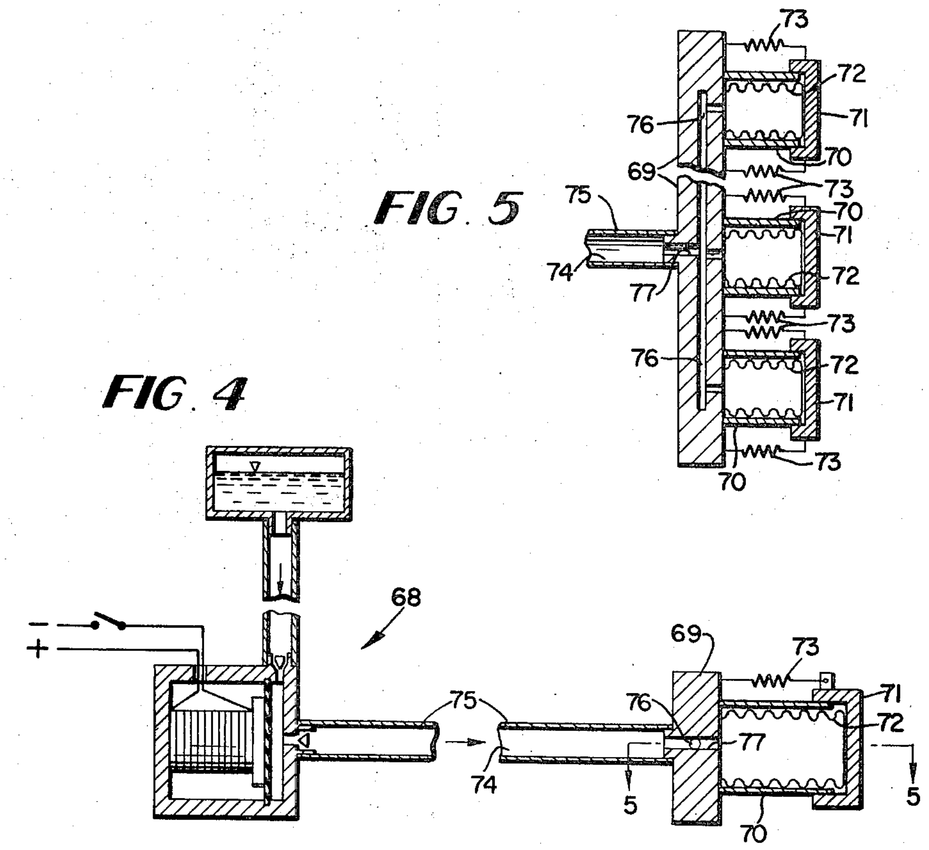
FIG. 4 is a fragmentary longitudinal sectional view on a reduced scale, partly diagramatic, illustrating a second modification.
FIG. 5 is a sectional view taken substantially along a plane as indicated by the line 5—5 of FIG. 4.

FIGS. 4 and 5 illustrate a second modification of the piezoelectric actuator, designated generally 68, which differs from the actuator 59 in that the disc 61 is replaced by an elongated head 69 from which a plurality of cylindrical portions 70, corresponding to the portion 62, project. Each cylindrical portion 70 has a head 71, a bellows 72 and springs 73, corresponding to the bellows, head and springs of the actuator 59 and which function in the same manner and for the same purpose. The passage 74 of the housing portion 75, which replaces the housing portion 60, discharges into the manifold 76 of the head 69 which has a branch passage 77 discharging into each bellows 72. When the chamber which includes the passage 74 is pressurized for forcing the drive liquid through the passage 74 toward the head 69, the drive liquid will be supplied through the ports 77 to simultaneously move the three drive heads 71 outwardly or from left to right for simultaneously displacing structural elements of optical equipment, for example, to adjusted positions. The other parts of the actuator 68 correspond to and function in the same manner as the parts of the actuator 7. However, the valve which replaces the valve 38 of the actuator 7 may be replaced by a separate control valve for each port 77, which valves may be selectively controlled in the same manner as the valve 38 for supplying the drive liquid under pressure to selected ones of the bellows 72.

Various other modifications and changes are contemplated and may be resorted to, without departing from the function or scope of the invention.

We claim as our invention:

1. A piezoelectric actuator comprising a housing having an extensible portion at one end thereof and a second end portion, a diaphragm sealing off the end portions of the housing from one another, a piezoelectric stack disposed in the housing between the diaphragm and said second end portion, said housing having a normally sealed liquid filled expansible chamber between the diaphragm and said extensible end portion, means for applying a prescribed voltage to the stack for expanding the stack and displacing the diaphragm into said housing chamber for extending said extensible end portion of the housing, said chamber including a restricted portion disposed between and spaced from said extensible end portion and the diaphragm, and valve means for closing said restricted portion for trapping the liquid between the valve means and said extensible end portion, when said voltage supply means is deenergized for unloading the stack and diaphragm, to maintain said extensible end portion in an extended position.

2. A piezoelectric actuator as in claim 1, and means for replenishing the liquid in said chamber between the diaphragm and valve for further extending said extensible end portion when said voltage supply means is reactivated.

3. A piezoelectric actuator as in claim 2, said liquid replenishing means including a liquid containing reservoir communicating with said chamber, and a valve controlling the passage of liquid between the reservoir and chamber.

4. A piezoelectric actuator as in claim 1, and means urging the stack to a retracted position for unloading the diaphragm when the voltage supply means is deenergized.

5. A piezoelectric actuator as in claim 1, said extensible end portion comprising a drive head telescopically mounted on a part of the housing.

6. A piezoelectric actuator as in claim 5, and an expansible bellows disposed in said chamber having an open end sealed to the housing around said restricted chamber portion and an opposite closed end bearing against said drive head, said bellows constituting a part of said liquid filled chamber.

7. A piezoelectric actuator as in claim 6, and means yieldably urging the drive head toward a retracted position.

8. A piezoelectric actuator as in claim 5, and means urging the stack toward a retracted position for unloading the diaphragm when the voltage supply means is de-energized.

9. A piezoelectric actuator as in claim 1, said extensible end portion comprising a plurality of telescopically mounted heads.

* * * * *